US011829258B2

United States Patent
Murakami et al.

(10) Patent No.: US 11,829,258 B2
(45) Date of Patent: Nov. 28, 2023

(54) DRIVE RECORDER, DATA RECORDING METHOD, AND PROGRAM RECORDING MEDIUM

(71) Applicant: JVCKENWOOD Corporation, Yokohama (JP)

(72) Inventors: Yuichi Murakami, Yokohama (JP); Yusuke Yamaguchi, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 151 days.

(21) Appl. No.: 17/560,508

(22) Filed: Dec. 23, 2021

(65) Prior Publication Data

US 2022/0114060 A1  Apr. 14, 2022

Related U.S. Application Data

(63) Continuation of application No. PCT/JP2020/023698, filed on Jun. 17, 2020.

(30) Foreign Application Priority Data

Jun. 26, 2019  (JP) ................................ 2019-118434

(51) Int. Cl.
   *G06F 11/14*       (2006.01)
   *B60W 40/12*       (2012.01)
   (Continued)

(52) U.S. Cl.
   CPC ......... *G06F 11/1466* (2013.01); *B60W 40/12* (2013.01); *G06F 11/1451* (2013.01); *G07C 5/008* (2013.01); *G07C 5/085* (2013.01)

(58) Field of Classification Search
   CPC ................................................ G06F 11/1466
   See application file for complete search history.

(56) References Cited

U.S. PATENT DOCUMENTS

2006/0247841 A1* 11/2006 Ono .................... F02D 41/2425
                                                             701/113
2017/0243412 A1*  8/2017 Deville ............... G06F 11/3013
                        (Continued)

FOREIGN PATENT DOCUMENTS

JP      2012234321 A    11/2012
JP      2013037574 A     2/2013
                 (Continued)

OTHER PUBLICATIONS

International Search Report for the corresponding PCT Application No. PCT/JP2020/023698 with English translation dated Aug. 25, 2020, 4 pages.

(Continued)

*Primary Examiner* — Edward J Dudek, Jr.
(74) *Attorney, Agent, or Firm* — Shih IP Law Group, PLLC

(57) ABSTRACT

A drive recorder includes: a recording control unit that records vehicle information in a first recording medium; a deterioration detection unit that detects deterioration of the first recording medium; a backup processing unit that performs a backup process of transferring at least a portion of the vehicle information recorded in the first recording medium to a second recording medium in response to detection of deterioration of the first recording medium; a suspension determination unit that determines whether it is possible to suspend recording the vehicle information in the first recording medium, based on the vehicle information; and an initialization processing unit that initializes the first recording medium when it is determined that the backup process is completed and it is possible to suspend recording the vehicle information.

8 Claims, 2 Drawing Sheets

(51) Int. Cl.
　　　*G07C 5/00*　　　(2006.01)
　　　*G07C 5/08*　　　(2006.01)

(56) References Cited

U.S. PATENT DOCUMENTS

2019/0220365 A1*　7/2019　Mallela ............... G06F 11/1456
2021/0053575 A1*　2/2021　Bielby .................. G06V 10/82
2021/0334030 A1*　10/2021　Yang ....................... G06F 3/067

FOREIGN PATENT DOCUMENTS

JP　　2013117778 A　　6/2013
JP　　2014220803 A　　11/2014

OTHER PUBLICATIONS

International Preliminary Examination Report on Patentability (I) with an English translation dated Dec. 28, 2021, 8 pages.

* cited by examiner

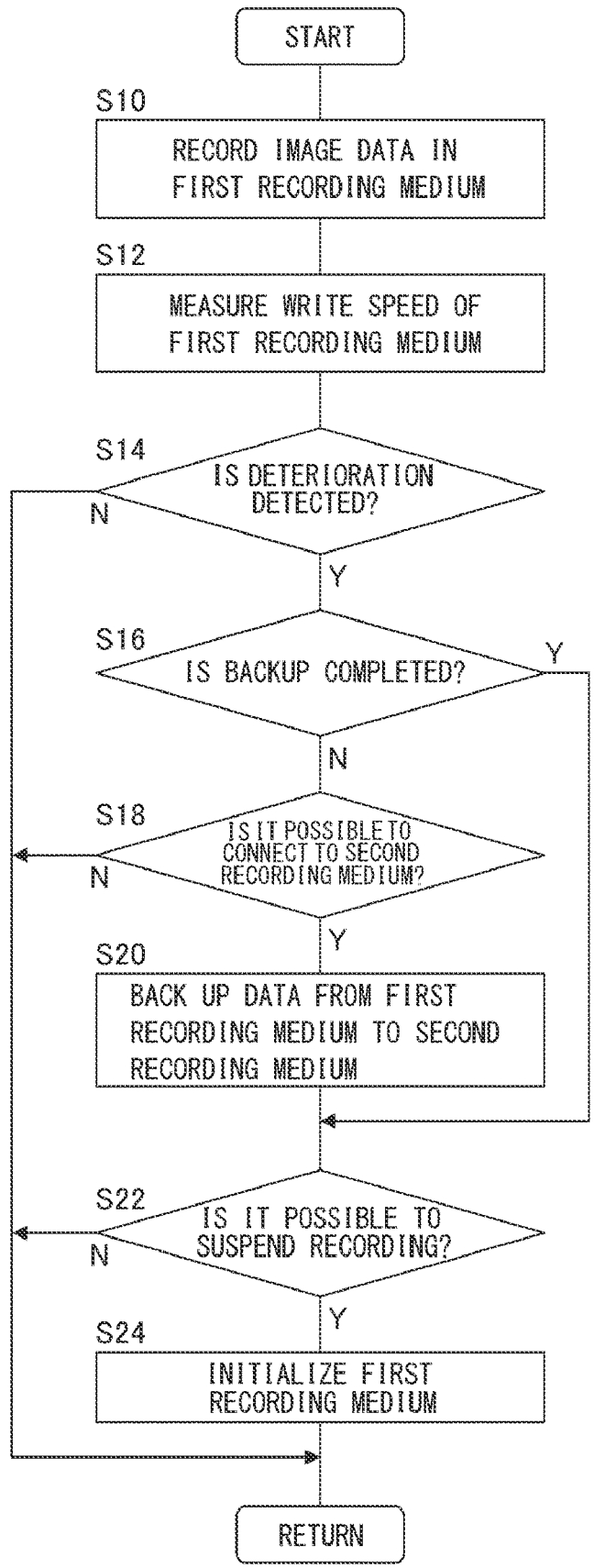

DRIVE RECORDER, DATA RECORDING METHOD, AND PROGRAM RECORDING MEDIUM

CROSS REFERENCE TO RELATED APPLICATION

This application is a continuation of application No. PCT/JP2020/023698, filed on Jun. 17, 2020, and claims the benefit of priority from the prior Japanese Patent Application No. 2019-118434, filed on Jun. 26, 2019, the entire content of which is incorporated herein by reference.

BACKGROUND

1. Field of the Invention

The present invention relates to a drive recorder, data recording method, and program recording medium.

2. Description of the Related Art

In recent years, drive recorders for taking and recording images capturing a scene in front of or behind a vehicle have been popularly used. In a drive recorder, image data is often recorded in a recording medium such as a flash memory. It is known that the read/write speed of a flash memory drops with use due to deterioration. The read/write speed is attempted to be restored by detecting deterioration of the flash memory and notifying the user accordingly and prompting the user to perform an initialization user operation (see, for example, patent literature 1).
[Patent literature 1] JP 2012-234321

Generally, the user of a drive recorder is the driver of the vehicle. It is therefore difficult for the user to respond when the driver is prompted to perform an initialization user operation while the user is driving the vehicle. The user may attempt to perform an initialization user operation after bringing the vehicle to a stop at a safe place but will have to back up data before initialization. Thus, the related art requires the user to go through the hassle of backup and initialization.

SUMMARY

A drive recorder according to an embodiment includes: a vehicle information acquisition unit that acquires vehicle information related to driving of a vehicle; a recording control unit that records the vehicle information in a first recording medium; a deterioration detection unit that detects deterioration of the first recording medium; a backup processing unit that performs a backup process of transferring at least a portion of the vehicle information recorded in the first recording medium to a second recording medium different from the first recording medium in response to detection of deterioration of the first recording medium; a suspension determination unit that determines whether it is possible to suspend recording the vehicle information in the first recording medium, based on the vehicle information; and an initialization processing unit that initializes the first recording medium when it is determined that the backup process is completed and it is possible to suspend recording the vehicle information.

Another embodiment relates to a data recording method. The method includes: acquiring vehicle information related to driving of a vehicle; recording the vehicle information in a first recording medium; detecting deterioration of the first recording medium; performing a backup process of transferring at least a portion of the vehicle information recorded in the first recording medium to a second recording medium different from the first recording medium in response to detection of deterioration of the first recording medium; determining whether it is possible to suspend recording the vehicle information in the first recording medium, based on the vehicle information; and initializing the first recording medium when it is determined that the backup process is completed and it is possible to suspend recording the vehicle information.

Optional combinations of the aforementioned constituting elements and replacement of constituting elements and implementations of the embodiment between methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 2 is a flowchart showing the flow of the initialization method.

DETAILED DESCRIPTION

Figure 1:
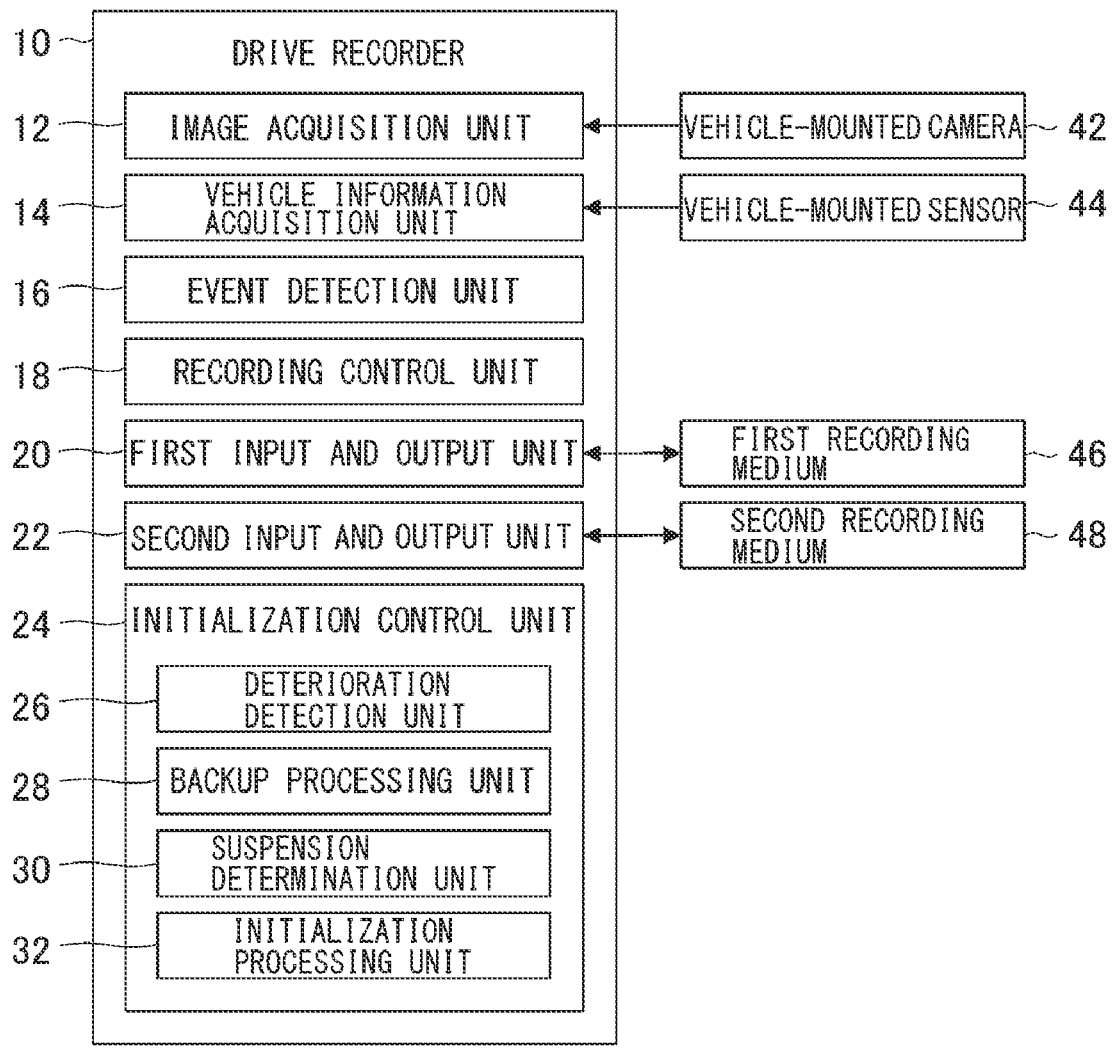
FIG. 1 is a block diagram showing a functional configuration of the drive recorder according to the embodiment.

The invention will now be described by reference to the preferred embodiments. This does not intend to limit the scope of the present invention, but to exemplify the invention.

A description will be given of an embodiment of the present invention with reference to the drawings. Specific numerical values shown in the embodiment are by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration.

A purpose of the embodiment is to provide a technology of automating the initialization process for restoring the read/write speed of a recording medium for a drive recorder.

FIG. 1 is a block diagram showing a functional configuration of a drive recorder 10 according to the embodiment. The functional blocks depicted are implemented in hardware such as devices and mechanical apparatus exemplified by a CPU and a memory of a computer, and in software such as a computer program. FIG. 1 depicts functional blocks implemented by the cooperation of these elements. Therefore, it will be understood by those skilled in the art that these functional blocks may be implemented in a variety of manners by a combination of hardware and software.

The drive recorder 10 includes an image acquisition unit 12, a vehicle information acquisition unit 14, a recording control unit 18, and an initialization control unit 24. The image acquisition unit 12 may be configured as a part of the vehicle information acquisition unit 14, or the image acquisition unit 12 may be included in the vehicle information acquisition unit 14. The drive recorder 10 may include an event detection unit 16, a first input and output unit 20, and a second input and output unit 22. The drive recorder 10 is mounted on a vehicle.

The image acquisition unit 12 acquires image data taken by a vehicle-mounted camera 42 provided in the vehicle. The vehicle-mounted camera 42 is configured to image a scene around the vehicle. For example, the vehicle-mounted camera 42 is configured to image a scene in front of the vehicle. The vehicle-mounted camera 42 may be configured to image only a scene outside the vehicle or image scenes both outside and inside the vehicle. A plurality of cameras may be mounted in a vehicle. For example, the plurality of cameras image scenes in front of, behind, and to the side of the vehicle, respectively. The vehicle-mounted camera 42 may be separate from the drive recorder 10 or built in the drive recorder 10. The image acquisition unit 12 may acquire, as vehicle information related to the driving of the vehicle, an image taken by the vehicle-mounted camera 42. The image acquisition unit 12 may be regarded as a part of the vehicle information acquisition unit 14.

The vehicle information acquisition unit 14 acquires vehicle information related to the driving of the vehicle from a vehicle-mounted sensor 44 provided in the vehicle. Specific examples of the vehicle-mounted sensor 44 include, but are not limited to, a vehicle speed sensor, steering angle sensor, accelerator position sensor, brake position sensor, acceleration sensor, gyro sensor, vehicle-mounted camera, radar sensor, LiDAR (Light Detection and Ranging), position information sensor (e.g., GNSS; Global Navigation Satellite System), passenger seat sensor, etc. The vehicle information acquisition unit 14 may acquire information related to the driving of the vehicle from a sensor provided in the drive recorder 10. For example, an acceleration sensor, a position information sensor, etc. may be provided in the drive recorder 10. The vehicle-mounted camera 42 may be regarded as one of vehicle-mounted sensors, and the vehicle information acquisition unit 14 may be configured to include the image acquisition unit 12.

The vehicle information acquisition unit 14 acquires information related to the speed of the vehicle, information related to the position of the vehicle, information related to an obstacle around the vehicle, information related to the operating condition of the driving assistance function of the vehicle etc. The vehicle information acquisition unit 14 may acquires, as information related to the speed of the vehicle, information indicating whether the vehicle is at a stop or not. The vehicle information acquisition unit 14 may acquire, as information related to the position of the vehicle, information indicating whether the vehicle is at a particular position such as the user's home. The vehicle information acquisition unit 14 may acquire, as information related to an obstacle around the vehicle, information indicating whether a further vehicle is located within a certain range around the vehicle or whether a pedestrian, a bicycle, an obstacle such as a fallen object, etc. is located on the traffic lane on which the vehicle is traveling. The vehicle information acquisition unit 14 may acquire information indicating whether a passenger is in the vehicle. The vehicle information acquisition unit 14 may acquire, as information related to the operating condition of the driving assistance function of the vehicle, information related to on/off of the automatic driving function or remote control function or information related to whether a particular driving assistance function is in operation. The driving assistance function is exemplified by, but is not limited to, adaptive cruise control (ACC) or lane keeping assistance system (LKAS).

The event detection unit 16 detects an occurrence of an event related to the vehicle, based on the image data acquired by the image acquisition unit 12 or the vehicle information acquired by the vehicle information acquisition unit 14. The event detection unit 16 detects an occurrence of an event such as an accident and collision of the vehicle or detects an occurrence of an event considered to be likely to result in an accident or collision of the vehicle. For example, the event detection unit 16 detects, as an event, an abrupt change in the vehicle behavior such as sudden braking, sudden steering, and sudden start by referring to information such as traveling speed and acceleration of the vehicle or information on manipulation of the accelerator, brake, and steering wheel. The event detection unit 16 may detect, as an event, approach to a vehicle in front, approach to an obstacle around the vehicle, separation from the traffic lane being traveled, based on the image data of the vehicle-mounted camera 42 or information from a radar sensor of the vehicle, etc.

The recording control unit 18 records the vehicle information acquired by the vehicle information acquisition unit 14 in a first recording medium 46 or a second recording medium 48. In the embodiment, the image data acquired by the image acquisition unit 12 included in the vehicle information acquisition unit 14 and the event information for identifying the event detected by the event detection unit 16 are described as being recorded in the first recording medium 46 or the second recording medium 48. The first recording medium 46 is a recording medium for mainly storing image data continuously taken by the vehicle-mounted camera 42. The second recording medium 48 is a recording medium capable of backing up the image data stored in the first recording medium 46.

The first recording medium 46 is comprised of a flash memory such as an SD card (registered trademark). The first recording medium 46 is used by being inserted in a slot provided in the drive recorder 10 and is configured to be removable from the drive recorder 10. The first recording medium 46 may be configured as a magnetic storage apparatus such as a hard disk drive.

The second recording medium 48 is an external storage apparatus that can be wirelessly connected to the drive recorder 10. The second recording medium 48 may be a storage apparatus provided in a portable terminal such as a smartphone or a storage apparatus provided in a data server, etc. connected via the Internet. Like the first recording medium 46, the second recording medium 48 may be comprised of a flash memory such as an SD card (registered trademark) and may be, like the first recording medium 46, a recording medium for storing image data continuously taken by the vehicle-mounted camera 42. The second recording medium 48 may be a non-volatile memory such as a flash memory built in the drive recorder 10 or a volatile memory such as a DRAM built in the drive recorder 10.

The recording control unit 18 records image data continuously taken by the vehicle-mounted camera 42 and continuously acquired by the image acquisition unit 12 in, for example, the first recording medium 46. When an event is detected by the event detection unit 16, the recording control unit 18 records image data including an image at a point of time corresponding to the occurrence of the event and event information in the first recording medium 46, using an overwrite-disabled attribute. The recording control unit 18 may record image data occurring when an event is not detected in the first recording medium, using an overwrite-enabled attribute. When image data, etc. cannot be recorded in the first recording medium 46, the recording control unit 18 may record image data and event information in the second recording medium 48.

The first input and output unit 20 is an interface for writing data in the first recording medium 46 and reading data from the first recording medium 46. When the first recording medium 46 is an SD card, the first input and output unit 20 includes a slot for accepting an SD card and a control circuit for controlling data read/write in the SD card.

The second input and output unit 22 is an interface for writing data in the second recording medium 48 and reading data from the second recording medium 48. When the second recording medium 48 is an external storage apparatus wirelessly connected to the drive recorder 10 or a storage apparatus provided in an external server, the second input and output unit 22 is a wireless communication apparatus. The second input and output unit 22 may be wirelessly connected to the second recording medium 48 via wi-fi (registered trademark) or Bluetooth (registered trademark) or wirelessly connected to the second recording medium 48 via a cellular phone line. The drive recorder 10 may not have a wireless communication apparatus built in and may be wirelessly connected to the second recording medium 48 via a wireless communication apparatus separate from the drive recorder 10. In this case, the second input and output unit 22 may be a port for wire connection to a wireless communication apparatus provided outside the drive recorder 10. When the second recording medium 48 is an SD card, the second input and output unit 22 may be configured like the first input and output unit 20.

The initialization control unit 24 controls a process for initializing the first recording medium 46 periodically. It is known that, when the first recording medium 46 is a flash memory such as an SD card, the first recording medium 46 is deteriorated, and the write speed of the first recording medium 46 changes (e.g., drops) by writing image data in the first recording medium 46 continuously. By writing image data repeatedly, for example, the data in the first recording medium 46 is fragmented, and the data read/write speed of the first recording medium 46 drops. If the read/write speed of the first recording medium 46 drops significantly, the speed of recording image data in the first recording medium 46 will fail to catch up with the speed of acquisition of image data by the image acquisition unit 12, with the result that the drive recorder will not function properly. It is considered to be effective to initialize (format) the first recording medium 46 in order to recover from a drop in the write speed. In order to initialize the first recording medium 46, it is necessary to back up important data recorded in the first recording medium 46 and temporarily suspend recording image data. The initialization control unit 24 ensures that the first recording medium 46 is properly initialized by sensing deterioration of the first recording medium 46, backing up the data in the first recording medium 46, and detecting a point of time when it is possible to suspend recording image data temporarily.

The initialization control unit 24 includes a deterioration detection unit 26, a backup processing unit 28, a suspension determination unit 30, and an initialization processing unit 32.

The deterioration detection unit 26 detects deterioration of the first recording medium 46. The deterioration detection unit 26 measures the read/write speed of the first recording medium 46 and monitors changes in the read/write speed. The deterioration detection unit 26 detects deterioration of the first recording medium 46 when the read/write speed of the first recording medium 46 drops to a predetermined value or lower or when the rate of change of the read/write speed of the first recording medium 46 is equal to or greater than a predetermined value. The deterioration detection unit 26 may hold, as an initial value, the read/write speed occurring immediately after the first recording medium 46 is initialized and detect deterioration of the first recording medium 46 based on the amount of change (e.g., the amount of drop) or the rate of change of the read/write speed with reference to the initial value. The deterioration detection unit 26 may detect deterioration of the first recording medium 46 when the read/write speed of the first recording medium 46 is equal or greater than a predetermined value.

The backup processing unit 28 performs a backup process of transferring the data recorded in the first recording medium 46 to the second recording medium 48 in response to the detection of deterioration of the first recording medium 46 by the deterioration detection unit 26. The backup processing unit 28 may back up the entirety of the data recorded in the first recording medium 46 or back up only a portion of the data recorded in the first recording medium 46. The backup processing unit 28 may back up only the overwrite-disabled data recorded in the first recording medium 46. For example, the backup processing unit 28 may back up only the event information and the image data associated with the event information.

The backup processing unit 28 may start a backup process in the event that deterioration of the first recording medium 46 is detected, and then the backup process in the second recording medium 48 is enabled. The backup processing unit 28 may start a backup process when wireless connection to the second recording medium 48 via wi-fi or Bluetooth is enabled. The backup process may be temporarily suspended when wireless connection to the second recording medium 48 is disabled and may be resumed when it becomes possible to reconnect to the second recording medium 48 subsequently. Therefore, the entirety of the data stored in the first recording medium 46 that should be backed up may be transferred to the second recording medium 48 at a time or transferred to the second recording medium 48 in multiple intermittent sessions. The backup processing unit 28 may perform a backup process of transferring the data recorded in the first recording medium 46 to the second recording medium 48 in the event that a backup process is enabled, irrespective of the detection of deterioration of the first recording medium 46 by the deterioration detection unit 26.

The backup processing unit 28 may start a backup process in the event that connection to a particular wireless communication network is enabled. For example, a backup process of transferring the data stored in the first recording medium 46 that should be backed up to the second recording medium 48 wirelessly connected to the drive recorder 10 may be started when the vehicle is stopped at the parking space of the user's home and the drive recorder 10 is connected to the wireless LAN of the user's home. The backup processing unit 28 may perform a backup process when the suspension determination unit 30 described later determines that it is possible to suspend recording image data. In other words, the backup processing unit 28 may perform a backup process when the recording control unit 18 does not write image data in the first recording medium 46. The backup processing unit 28 may perform a process of backing up data from the first recording medium 46 to the second recording medium 48 in parallel with the writing of image data in the first recording medium 46 by the recording control unit 18.

The suspension determination unit 30 determines whether it is possible to suspend recording image data in the first recording medium 46 temporarily. Stated otherwise, the suspension determination unit 30 determines whether it is all right to temporarily suspend the function of the drive recorder 10 for recording image data. The suspension determination unit 30 determines whether it is possible to suspend recording image data, based on the image data acquired by the image acquisition unit 12 or the vehicle information acquired by the vehicle information acquisition unit 14.

The suspension determination unit 30 determines, for example, that it is possible to suspend recording image data when it is considered that an event subject to detection by the event detection unit 16 is unlikely to occur. The suspension determination unit 30 determines whether it is possible to suspend recording image data, based on at least one of a condition related to the vehicle speed, a condition related to the vehicle position, a condition related to an obstacle around the vehicle, and a condition related to the operating condition of the driving assistance function of the vehicle. For example, the suspension determination unit 30 may determine that it is possible to suspend recording image data when the vehicle is at a stop. Alternatively, the suspension determination unit 30 may determine that it is possible to suspend recording image data when the vehicle is at a stop at a particular position (spot) such as the parking space of the user's home. It may be determined that it is possible to suspend recording image data when the vehicle is at a stop at a particular position (spot) and a passenger is in the vehicle. Alternatively, it may be determined that it is possible suspend recording image data when the vehicle is traveling at predetermined speed or lower or is temporarily at a stop at an intersection or the like and when there are no obstacles around the vehicle. The suspension determination unit 30 may determine whether it is possible to suspend recording image data based on on/off of the driving assistance function of the vehicle or on/off of the ignition of the vehicle. It is preferred that these determination conditions be user configurable, and the suspension determination unit 30 may determine whether it is possible to suspend recording image data based on the determination condition configured by the user.

The initialization processing unit 32 performs an initialization process of the first recording medium 46. The initialization processing unit 32 attempts to restore the write speed of the first recording medium 46 by, for example, performing quick formatting for initializing the file management area stored in the first recording medium 46. The initialization processing unit 32 performs a process of initializing the first recording medium 46 when the backup process by the backup processing unit 28 is completed and the suspension determination unit 30 determines that it is possible to suspend recording image data. Loss of important data due to initialization of the first recording medium 46 is prevented by initializing the first recording medium 46 after the backup process is completed. Further, by initializing the first recording medium 46 when it is possible to suspend recording image data, the likelihood that a problem is caused by the failure to record image data acquired during the initialization process of the first recording medium 46.

The backup processing unit 28 may transfer the data backed up in the second recording medium 48 to the first recording medium 46 for restoration after the initialization process of the first recording medium 46 is completed. The backup processing unit 28 may return the data backed up in the second recording medium 48 to the first recording medium 46 when wireless connection to the second recording medium 48 is enabled after the initialization process of the first recording medium 46 is completed.

The initialization processing unit 32 may initialize the first recording medium 46 on the condition that wireless connection to the second recording medium 48 is enabled. In this case, the process of backing up from the first recording medium 46 to the second recording medium 48, the process of initializing the first recording medium 46, and the process of restoring data from the second recording medium 48 to the first recording medium 46 can be performed continuously.

FIG. 2 is a flowchart showing the flow of data recording method of the drive recorder 10. The recording control unit 18 records the image data acquired by the image acquisition unit 12 in the first recording medium 46 (S10). The deterioration detection unit 26 measures the write speed of the first recording medium 46 (S12) to detect deterioration of the first recording medium 46 (S14). When deterioration of the first recording medium 46 is detected (Y in S14), and the backup from the first recording medium 46 to the second recording medium 48 has not been completed (N in S16), the backup processing unit 28 checks whether it is possible to connect to the second recording medium 48 (S18). When it is possible to connect to the second recording medium (Y in S18), the backup processing unit 28 backs up at least a portion of the data in the first recording medium 46 in the second recording medium 48 (S20). After the backup process is completed, the suspension determination unit 30 determines whether it is possible to suspend recording image data (S22). When it is possible to suspend recording image data (Y in S22), the initialization processing unit 32 initializes the first recording medium 46 (S24).

When determination of the first recording medium 46 is not detected in S14 (N in S14), the steps S16-S24 are skipped. When the backup from the first recording medium 46 to the second recording medium 48 is competed in S16 (Y in S16), the steps S18-S20 are skipped. When it is not possible to connect to the second recording medium 48 in S18 (N in S18), the steps S20-S24 are skipped. When it is not possible to suspend recording image data in S22 (N in S22), the step of S24 is skipped.

According to the embodiment, data backup and initialization of the first recording medium 46 can be performed automatically when deterioration of the first recording medium 46 is detected, which saves the user the hassle required in backup and initialization. It also saves the user the work of manipulating the drive recorder 10 for backup or initialization or attach or detach the drive recorder 10 for manipulation of the drive recorder 10. When the vehicle-mounted camera 42 is provided in the drive recorder 10, user manipulation of the drive recorder 10 may change the field angle of the vehicle-mounted camera 42 and make it impossible to take proper image data. According to the embodiment, the frequency of the user touching the drive recorder 10 with the hand can be reduced so that the variation in the field angle of the vehicle-mounted camera 42 can be prevented, and image data can be acquired properly.

The present invention has been described above with reference to the embodiment but is not limited to the embodiment. Appropriate combinations or replacements of the features of the illustrated examples are also encompassed by the present invention.

In the embodiment described above, the drive recorder 10 is depicted as acquiring and recording images. The information acquired and recorded need not be limited to images, and the drive recorder 10 may acquire and record sound or position information or acquire and record information related to vehicle traveling other than images.

The drive recorder 10 may be provided with a third recording medium (not shown). For example, the recording control unit 18 may record the image data acquired by the image acquisition unit 12 or the vehicle information acquired by the vehicle information acquisition unit 14 in the third recording medium while the backup processing unit 28 is performing a backup process of transferring the data recorded in the first recording medium 46 to the second recording medium 48. This results in distributed memory access to the respective recording mediums to back up data and to record images or vehicle information. Accordingly, the images and vehicle information can be recorded more properly.

What is claimed is:

1. A drive recorder comprising:
a vehicle information acquisition unit that acquires vehicle information related to driving of a vehicle;
a recording control unit that records the vehicle information in a first recording medium;
a deterioration detection unit that detects deterioration of the first recording medium;
a backup processing unit that performs a backup process of transferring at least a portion of the vehicle information recorded in the first recording medium to a second recording medium different from the first recording medium in response to detection of deterioration of the first recording medium;
a suspension determination unit that determines whether it is possible to suspend recording the vehicle information in the first recording medium, based on the vehicle information; and
an initialization processing unit that initializes the first recording medium when it is determined that the backup process is completed and it is possible to suspend recording the vehicle information.

2. The drive recorder according to claim 1, wherein
the suspension determination unit determines whether it is possible to suspend recording the vehicle information based on at least one of a condition related to vehicle speed, a condition related to vehicle position, a condition related to an obstacle around the vehicle, and a condition related to an operating condition of a driving assistance function of the vehicle.

3. The drive recorder according to claim 1, wherein
the backup processing unit performs the backup process when it is determined that it is possible to suspend recording the vehicle information.

4. The drive recorder according to claim 1, wherein
the recording control unit records the vehicle information acquired by the vehicle information acquisition unit in the second recording medium while the first recording medium is being initialized.

5. The drive recorder according to claim 1, wherein
the second recording medium is an external recording apparatus wirelessly connected to the drive recorder,
the backup processing unit performs the backup process when it is possible to connect to the second recording medium wirelessly, and
the initialization processing unit initializes the first recording medium when it is possible to connect to the second recording medium wirelessly.

6. The drive recorder according to claim 1, wherein
the second recording medium is a volatile or non-volatile memory built in the drive recorder.

7. A data recording method, comprising:
acquiring vehicle information related to driving of a vehicle;
recording the vehicle information in a first recording medium;
detecting deterioration of the first recording medium;
performing a backup process of transferring at least a portion of the vehicle information recorded in the first recording medium to a second recording medium different from the first recording medium in response to detection of deterioration of the first recording medium;
determining whether it is possible to suspend recording the vehicle information in the first recording medium, based on the vehicle information; and
initializing the first recording medium when it is determined that the backup process is completed and it is possible to suspend recording the vehicle information.

8. A non-transitory program recording medium comprising computer-implemented modules including:
a module that acquires vehicle information related to driving of a vehicle;
a module that records the vehicle information in a first recording medium;
a module that detects deterioration of the first recording medium;
a module that performs a backup process of transferring at least a portion of the vehicle information recorded in the first recording medium to a second recording medium different from the first recording medium in response to detection of deterioration of the first recording medium;
a module that determines whether it is possible to suspend recording the vehicle information in the first recording medium, based on the vehicle information; and
a module that initializes the first recording medium when it is determined that the backup process is completed and it is possible to suspend recording the vehicle information.

* * * * *